June 3, 1952 L. S. WILLIAMS 2,598,871
MOUNTING FOR INDICIA VIEWING ASSEMBLIES
Filed Oct. 2, 1948 3 Sheets-Sheet 1
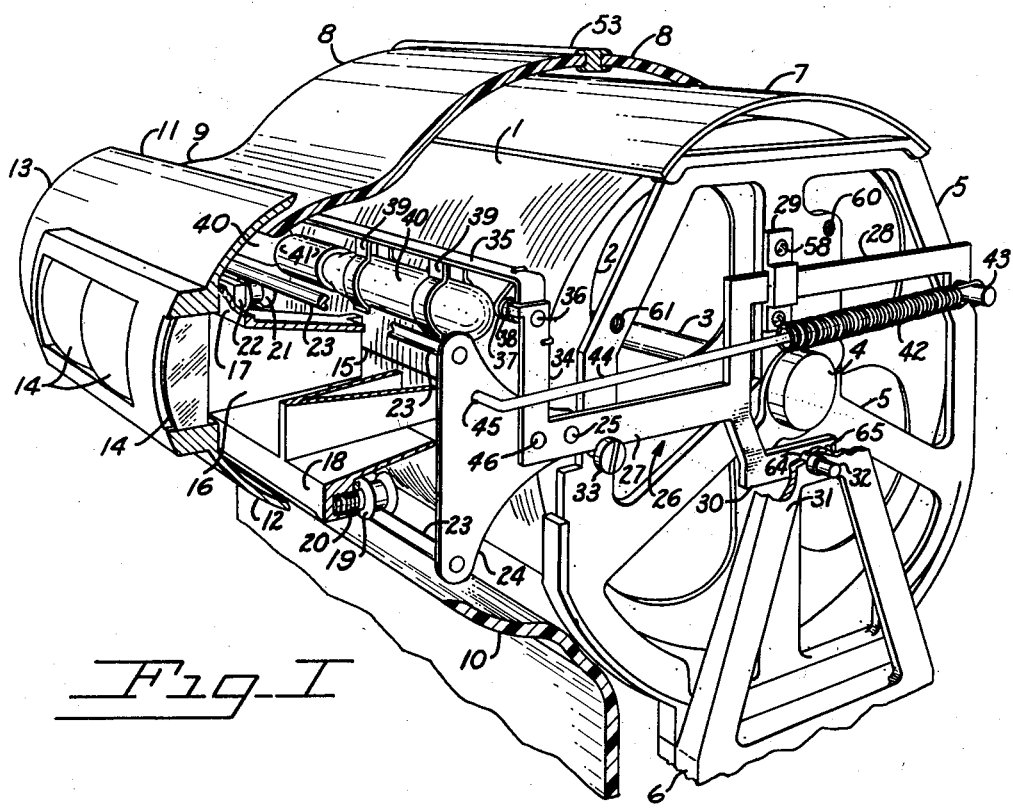
Fig. I
Fig. II
INVENTOR.
Lawrence S. Williams
BY Marshall, Marshall & Leonard
ATTORNEYS June 3, 1952    L. S. WILLIAMS    2,598,871
MOUNTING FOR INDICIA VIEWING ASSEMBLIES
Filed Oct. 2, 1948    3 Sheets-Sheet 2
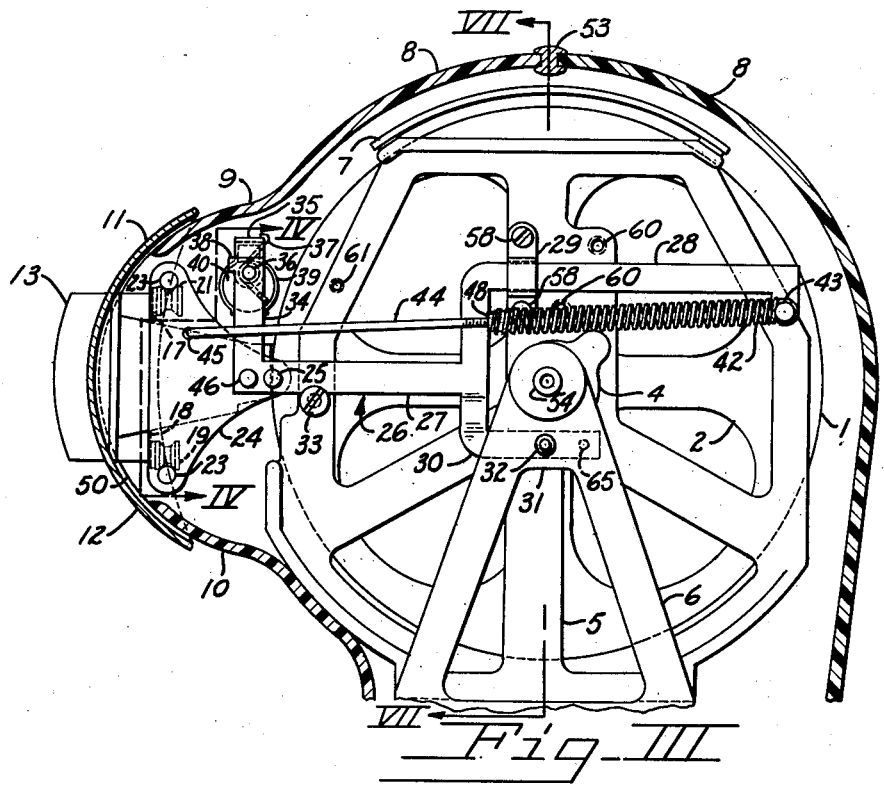
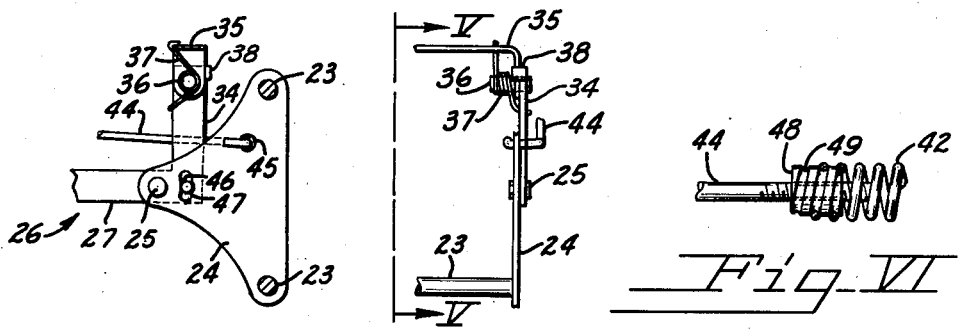
INVENTOR.
Lawrence S. Williams
BY
Marshall, Marshall & Leonard
ATTORNEYS

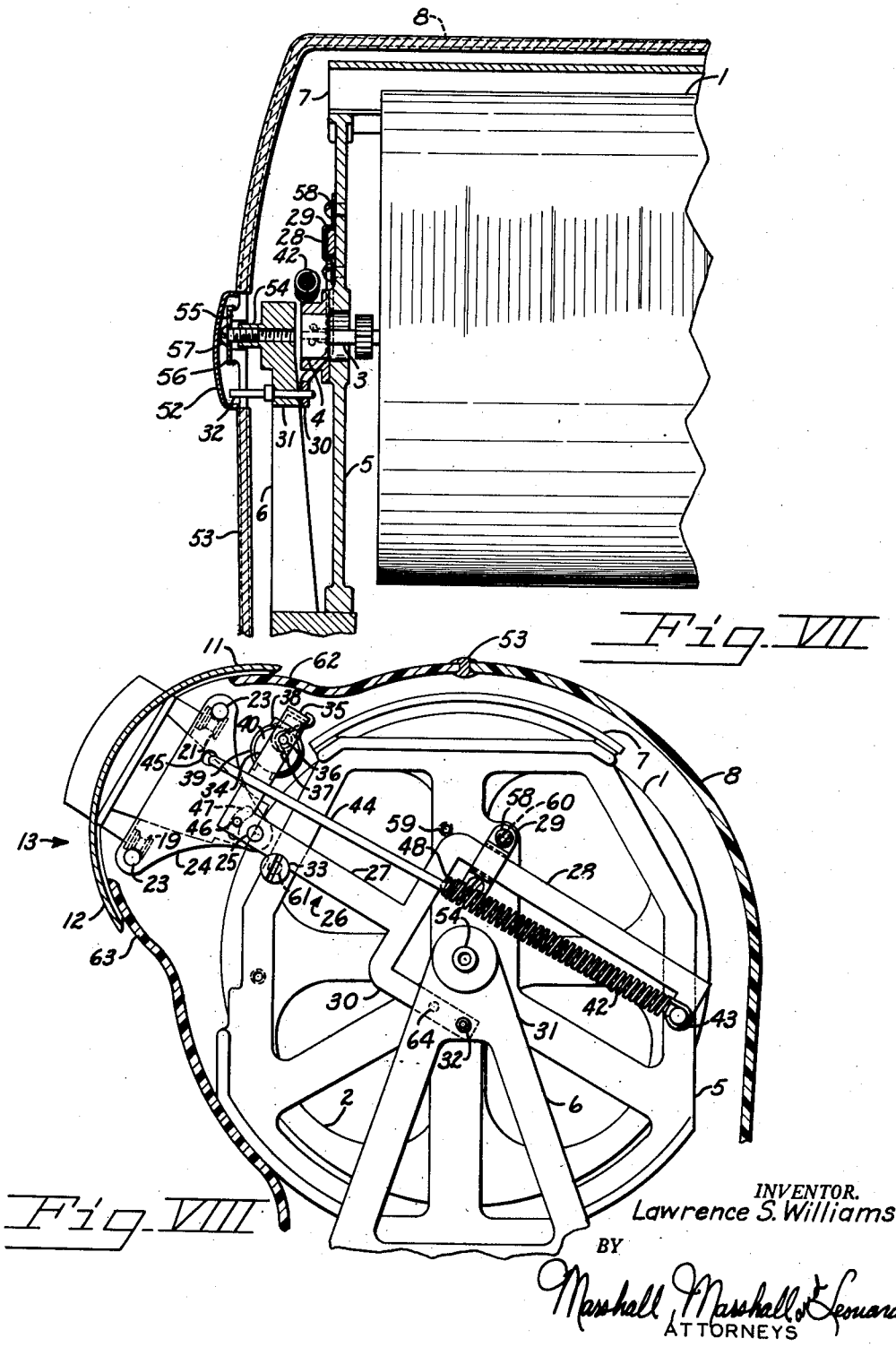

Patented June 3, 1952

2,598,871

UNITED STATES PATENT OFFICE 2,598,871

MOUNTING FOR INDICIA VIEWING ASSEMBLIES

Lawrence S. Williams, Toledo, Ohio, assignor to Toledo Scale Company, Toledo, Ohio, a corporation of New Jersey Application October 2, 1948, Serial No. 52,583

9 Claims. (Cl. 116—129)

This invention relates to weighing scales and in particular to an improved mounting for an indicia viewing assembly of a scale.

In an effort to secure great apparent travel of the chart of a weighing scale and thus apparently widely spaced indicia, it has been customary to provide magnifying lenses mounted in the observer's line of vision and adapted to provide enlarged virtual images of the indicia on the chart and a cooperating index. Since any increase in apparent size obtained by a lens system results in a corresponding decrease in apparent brilliance of the indicia, it is customary to provide artificial illumination for that portion of the chart or other indicia bearing surface that is included within the field of view of the magnifying lenses.

It is, furthermore, customary to enclose the indicia bearing chart and the reading index as well as the source of artificial illumination within a housing such that these elements are protected and such that the source of illumination is not directly visible. In the usual arrangement of the indicia bearing chart and light source within the housing and generally behind the lens system it is necessary to remove the housing whenever it becomes necessary to gain access to the interior of the indicia viewing assembly or the light source.

The principal object of this invention is to provide an improved mounting for the indicia viewing assembly which mounting permits movement of the assembly away from the indicia bearing element and thus permits access to the interior of the viewing assembly and to the light source.

Another object of the invention is to provide a simple movable framework for supporting the indicia viewing assembly.

A still further object of the invention is to support the light source from the movable frame such that the light source is brought from a position within the housing where the indicia viewing assembly is in its viewing position to a position outside of the housing when the movable frame is drawn to its extended position.

A still further object of the invention is to provide locking mechanism for holding the movable frame in its indicia viewing or retracted position and of locating such locking mechanism in a position that is accessible without removing the housing of the scale.

More specific objects and advantages are apparent from the following description of a preferred embodiment of the invention.

According to the invention, a condition responsive indicia bearing chart is mounted in a first frame and an indicia viewing assembly which may include magnifying lenses is mounted on a second frame which second frame is movably supported from the first frame. A housing encloses the indicia bearing member or chart and has an opening that is covered by the indicia viewing assembly. The movement permitted by the movable frame carrying the indicia viewing assembly is sufficient to permit access to the interior of the indicia viewing assembly as well as to the interior of the housing when the assembly is moved to its extended position. The principal advantage of the improved structure is the possibility of replacing light bulbs or making other minor repairs or adjustments to the viewing assembly without removing the housing of the scale or endangering the fragile indicia bearing member.

A preferred embodiment of the invention is illustrated in the accompanying drawings.

In the drawings:

Figure I is a perspective view, with parts broken away and other parts shown in section, of the indicating and viewing mechanism of a weighing scale constructed according to the invention.

Figure II is an end elevation of the indicating portion of the weighing scale with the viewing assembly shown in its extended position.

Figure III is an end elevation of the indicating mechanism showing the improved mounting of the viewing assembly.

Figure IV is a fragmentary elevation taken substantially along the line IV—IV of Figure III.

Figure V is a fragmentary elevation of a portion of the viewing assembly as seen from the line V—V of Figure IV.

Figure VI is an enlarged fragmentary detail showing the connection between one end of the spring that counterbalances the weight of the lens assembly and a rod connected to the assembly.

Figure VII is a longitudinal section taken substantially along the line VII—VII of Figure III.

Figure VIII is a vertical section similar to Figure III showing the viewing assembly mounted at an elevated angle as is employed when the indicating portion of the scale is substantially below the observer's eye level.

These specific figures and the accompanying description are intended merely to illustrate the invention but not to impose limitations on the claims.

The indicating portion of a weighing scale embodying the invention includes an indicia bearing chart 1 that is rolled to a cylindrical form and that is supported on spiders 2 which in turn are carried on an indicator shaft 3. The indicator shaft 3 is journaled in ball bearings contained within bearing cases 4 which are mounted on end frames 5. The end frames 5, there being one at each end of the cylindrical chart 1, form the upper parts of or are attached to uprights 6 of the weighing scale. The uppermost parts of the end frames 5 are interconnected by a dust shield 7 extending over the indicia bearing chart 1. If desired, the edges of the dust shield 7 may be turned up to provide gutters or troughs so that dust that collects on the shield can not slide down over the edge and onto the chart.

The indicia bearing member, the chart 1, is thus carried on a frame, the end frame 5, and it is enclosed within a housing 8 a portion of which is extended forward forming lips 9 and 10 that cooperate with skirts 11 and 12 of a semicylindrical cover 13 to complete the enclosure of the chart 1. The cover 13 is part of an indicia viewing assembly that includes a plurality of lenses 14 mounted in the cover 13 each of the lenses being located to present to an observer a magnified virtual image of a portion of a reading line 15 and those of the indicia on the indicia bearing chart 1 that are adjacent the reading line 15. The reading line may consist of a stretched cord, thread or a fine stretched wire and is positioned closely adjacent but not touching the surface of the chart 1.

The field of view of each of the lenses 14 is limited by a frusto-pyramidal lens cell 16 the large end of which abuts the inner surface of the cover 13 adjacent the cooperating lens 14 and the small end of which is close to the reading line 15 and the surface of the chart 1. The taper or slope of the sides of the lens cells 16 corresponds to the slope of the marginal rays passing through the lenses 14 so that an observer looking through the lenses has the impression that he is looking through a straight sided rectangular tube. The lenses 14, four in number, are arranged in two groups of two lenses each. In each group the lenses, which are rectangular in front elevation, are side by side so that the apparent fields of view of the lenses are substantially continuous and appear to cover two sets of indicia. Horizontal movement of the cover 13 moves the lenses to bring other sets of indicia into the fields of view. The two groups of lenses are separated by sufficient space so that the fields of view of the lenses, as the cover 13 carrying the lenses is moved back and forth, never include a narrow band around the center of the chart 1 which band is reserved for weight indicia displayed on the customer's side of the scale.

The lens cells 16 are formed as an integral group having a top rail 17 and a bottom rail 18 extending the full length of the group of cells. A pair of grooved rollers 19 one located near each end of the group of lens cells 16 are journaled on studs 20 threaded into the lower rail 18. A similar grooved roller 21 is mounted from an adjustable block 22 secured to the upper rail 17. The lower rollers 19 and the upper roller 21 engage the upper and lower sides respectively of a pair of support rods 23 that are held in spaced relation by generally triangular end pieces 24. Since the cover 13 is attached to the upper and lower rails 17 and 18 of the lens cells and since these rails are also supported through the grooved rollers from the support rods 23, it follows that the entire viewing assembly is movable along the reading line 15 so as to bring selected portions of the area of the chart 1 into the field of view of the lenses.

The generally triangular end pieces 24 are carried on pivot pins 25 of a pair of movable (in this embodiment slidable) frames 26 that are carried from the end frames 5. Each of the frames 26 consists of a first leg 27 that extends substantially radially with respect to the cylindrical chart 1, a vertically offset leg 28 that is slidably mounted in a clip 29 secured to the end frame 5, and a lower offset leg 30 that passes closely adjacent the inner surface of an upper portion 31 of the scale upright 6. A pin 32 inserted through the upper portion 31 locks the slidable frame 26 in its retracted position. The radially extending horizontal leg 27 rides on the shank of a large headed screw 33 that is screwed into the front part of the end frame 5. In the retracted position of the viewing assembly the pivot pins 25 carrying the triangular end pieces 24 are substantially in line with the reading line 15 so that regardless of the tilting motion of the viewing assembly that is permitted by the pivot pins 25 the reading line remains substantially at the center of the fields of view of the lenses.

The forward ends of the movable frames 26 have upwardly directed extensions 34 between the upper ends of which a light source frame 35 is mounted on pivot pins 36. Springs 37 mounted on the pivot pins 36 and engaging the pivoted light source frame 35 and the extensions 34 tend to rotate the frame in a counterclockwise direction as seen in Figure I until such motion is limited by lips 38 that engage the side of the frame 35. The light source frame 35 includes a plurality of spring clips 39 adapted to grasp tubular light source bulbs 40 that are electrically connected through a socket 41 to a source of electrical power. The light source bulbs 40 are arranged to illuminate that portion of the chart 1 that is visible through the lenses 14 and lens cells 16. In fact, the upper portion of the inner end of each of the light cells 16 is cut away to increase the amount of illumination reaching the chart 1.

The weight of the cover 13, the lenses 14, and the lens cells 16 is located forward of the pivot pins 25 and if not restrained would tip the viewing assembly downwardly. The required restraint is furnished by tension springs 42 one at each end of the indicating assembly. Each spring 42 is hooked over a pin 43 set in the rearward end of the upper offset leg 28 of the slidable frame 26 and the other end of the spring is connected to a rod 44 the forward end of which is hooked through a hole 45 in the upper part of the triangular end piece 24. The rate— the force per unit of extension—of the spring 42 and the location of the hole 45 with respect to the pivot pin 25 are selected so that the weight of the viewing assembly is accurately counterbalanced for all positions to which it may be tilted. The amount of such tilt is limited by a stop pin 46 that engages a slot 47 (Figure V) in the end piece 24.

To vary the rate of the increment of force per unit of extension of the spring 42 a connector 48 (Figure VI) threaded onto the rod 44 and having a spiral groove 49 so that it may be screwed into the spring 42 with the wire of the spring resting in the groove 49 is provided. The rate of the spring 42, which varies according to its effective length, is determined by the distance that the connector 48 is screwed into the spring 42 while the magnitude of the pull exerted by the spring is regulated by the distance that the rod 44 is threaded through the connector 48. This combination of adjustments permits the weight of the viewing assembly to be accurately counterbalanced.

Referring now to Figures I and II, it will be seen that the housing 8 at the ends of the lip portions 9 and 10 is closed by generally semicircular end housing sections 50 and that the ends of the semicylindrical cover 13 of the viewing assembly is closed by crescent shaped end portions 51. Since the viewing assembly is tiltable by rotation about the pivot points 25 the curved portions of the semicircular ends 50 are made concentric with respect to the retracted position of the pivot pins 25 which, in their retracted position, are in line with the reading line 15. The lips 9 and 10 of the housing 8 and the skirts 11 and 12 are concentric about the same axis so that the skirts may be closely fitted over the lips of the housing. The overlapping engagement of these portions is sufficient to permit the viewing assembly to be tilted throughout its complete range of travel as determined by the stop pins 46 and slots 47 without leaving an opening or gap between the overlapping skirts 11 and 12 and lips 9 and 10.

When it is necessary to replace one of the light bulbs 40 or for some other reason it is desired to gain access to the interior of the viewing assembly, the pins 32 which are concealed behind removable decorative caps 52 of the housing are pulled out to their limit of travel, which may be determined by snap rings or other fastening devices, thereby unlocking the movable frames 26. This unlocking permits the viewing assembly to be drawn forward away from the chart 1 and housing 8 with the radially extending legs 27 of the movable frames 26 sliding on the shanks of the large headed screws 33 and with the upper legs 28 of the frames 26 sliding through the clips 29. As the frames 26 move forward the light source frame 35, the top of which is slightly higher than the bottom of the housing lip 9 strikes that lip but since the frame 35 is pivoted on the pins 36 the frame 35 merely tips backward and slides along beneath the lip until the viewing assembly has been moved forward to the limit permitted by the clips 29. This exposes the light source frame 35 which may be manually rotated to the position shown in Figure II thereby bringing the light source bulbs 40 into an upper position where they may be extracted from the clips 39. After replacement, the light source frame 35 is held manually approximately in the position shown as the viewing assembly is started back toward the housing. After the light source frame 35 has entered beneath the lip 9 it may be released and the springs 37 then position the light source as the viewing assembly is returned to is retracted position.

This movement of the viewing assembly toward or away from the chart makes it extremely simple to replace light bulbs or make other minor repairs or adjustments within the viewing assembly without endangering the fragile indicia bearing chart 1 or requiring the removal of the housing 8.

While it is not clearly apparent in the drawings, the length of the viewing assembly cover 13 between the inside faces of the end portions 51 is longer than the distance between the outside faces of the semicircular housing portions 50 so that the viewing assembly may be moved endwise on the supporting rods 23 a distance substantially equal to the field of view of one of the lenses 14. This amount of movement is sufficient to permit all portions of the chart length with the exception of the narrow band reserved for the weight indication on the customer's side of the scale to be successively brought within the field of view of the system of lenses 14.

The proportions of the various parts and details of construction are shown in Figures III to VI inclusive.

Referring now to Figure VII, which is a vertical section through one end of the indicating assembly of the weighing scale, the relative position of the end frame 5 and the upper part of the main scale upright 6 is clearly shown. The housing 8, which consists of front and back portions held in alignment by a molding 53 that is H-shaped in cross section, encloses the indicating mechanism as well as the uprights 6. Adjacent each of the uprights 6 the front and back portions of the housing 8, in line with a boss 54 at the upper end of the upright 6, have projections 55 that are engaged and covered by a cup-shaped washer 56 held in place by a screw 57 threaded horizontally into the upper end of the adjacent upright 6. The H-shaped molding 53 separates the housing portions to allow the locking pin 32 to extend slightly beyond the housing so that when the decorative cap 52, which is held in place by spring clips, is removed the end of the pin may be grasped and the pin withdrawn from its locking position.

Figure VIII shows the improved indicia viewing assembly as it is installed on a weighing scale in which the observer's line of vision is directed approximately 30° below the horizontal when looking through the viewing assembly at the indicia on the chart. Comparing Figures III and VIII, the structure shown in Figure III being arranged for horizontal viewing, it will be noticed that the end frames 5 are identical, that the movable frames 26 are identical, and that the entire viewing assembly enclosed within the cover 13 and mounted on the movable frames 26 is the same. One difference between the horizontal and the angular viewing arrangements is that the clip 29 is moved from its substantially vertical position on the forward edge of the spoke of the end frame to an angular position on that same spoke. Thus in Figure III, showing the horizontal arrangement, the clip is fastened by screws 58 threaded into holes 59 while in Figure VIII the clip has been moved so as to be fastened by screws 58 now threaded into holes 60. In each view the holes that are in use are concealed by the clip 29.

Likewise, when going from the horizontal to the angular viewing position the screws 33 on which the radial leg 27 of the movable frame 26 rests are moved from their lower positions as seen in Figures I and III to upper positions where they thread into holes 61 of the end frames 5.

The housing is modified, of course, in going from the horizontal viewing arrangement to the other in that the angular viewing arrangement of Figure VIII has housing lips 62 and 63 that are located much higher relative to the indicia bearing chart 1 than are the lips 9 and 10 of the housing shown in Figures I and III. However, the arrangement of the lips 62 and 63 with respect to the skirts 11 and 12 of the viewing assembly is the same regardless of the arrangement. The locking arrangement is the same since the lower leg 30 of the movable frame 26 is provided with a pair of holes 64 and 65 arranged so that the hole 64 is engaged by the locking pin 32 when the movable frame 26 is in the horizontal arrangement and is engaged in the hole 65 when the angular or inclined viewing arrangement is employed.

The movement of the movable frame is substantially radial in each arrangement but departs from precise radial alignment sufficiently to permit the locking pin 32 to be used in either arrangement.

The movable frames 26 constitute the preferred method of carrying the indicia viewing assembly so as to permit it to be moved toward or away from the indicia bearing chart 1. The structure is simple to construct and sufficiently rigid to hold the viewing assembly in its proper position. The inaccuracies in manufacture or assembly, however, do not affect the accuracy of the indication because the thread constituting the reading line 15 is supported from the end frames 5 independently of the slidable frames 26. The only requirement affecting the viewing assembly is that the reading line 15 shall be located approximately along the horizontal center line of the field of view of the lenses 14.

Various modifications in the construction and mounting of the movable frames may be made without departing from the spirit and scope of the invention.

Having described the invention, I claim:

1. In a structure of the class described, in combination, an indicia bearing member, a frame supporting said member, a housing covering said member, an indicia viewing assembly, and a second frame that supports the viewing assembly and that is movably mounted on the first frame, the movable mounting of the second frame permitting the viewing assembly to be moved from a viewing position at which the housing bars access to the interior of the viewing assembly to a non-viewing position at which the interior of the assembly is accessible.

2. In a structure of the class described, in combination, an indicia bearing member, a frame supporting said member, a housing covering said member, an indicia viewing assembly, and a second frame that supports the viewing assembly and that is mounted for movement relative to the first frame whereby the viewing assembly may be moved from its operative position relative to the housing to an accessible position adjacent the housing.

3. In a structure of the class described, in combination, an indicia bearing member, a frame supporting said member, a housing covering said member, an indicia viewing assembly, a second frame that supports the viewing assembly and that is mounted on the first frame for movement between a retracted and an extended position relieve to the housing, and a light source supporting frame that is movably mounted on said second frame independently of the viewing assembly.

4. In an indicating assembly of a weighing scale, in combination, an indicia bearing member, a frame supporting said member, a housing covering said member, a lens assembly the indicia viewing portion of which is movable parallel to the surface of said member, and a second frame that pivotally supports the lens assembly, a pair of leg-like members in the second frame that slidably engage the first frame to movably mount the second frame on the first mentioned frame for movement of the lens assembly toward or away from said member.

5. In an indicating assembly of a weighing scale, in combination, an indicia bearing member, a frame supporting said member, a housing covering said member, a lens assembly the indicia viewing portion of which is movable parallel to said member, a second frame on which the lens assembly is pivotally supported, said second frame having a pair of leg-like members slidably mounted on the first frame for supporting the second frame, and a spring acting between the lens assembly and the movably mounted second frame for counterbalancing the weight of the lens assembly.

6. In an indicating assembly of a weighing scale, in combination, an indicia bearing member, a frame supporting said member, a housing covering said member, an indicia viewing assembly, a second frame that is movably mounted on the first frame, said viewing assembly being pivotally mounted on the second frame, and a spring acting between the viewing assembly and the second frame for counterbalancing the weight of the assembly.

7. In an indicating assembly of a weighing scale, in combination, an indicia bearing member, a frame supporting said member, a housing covering said member, an indicia viewing assembly, a second frame that supports the viewing assembly and that is movably mounted on the first frame, said viewing assembly being movable by movement of the second frame between a viewing position and a non-viewing position, and locking means for holding the second frame with the viewing assembly in viewing position.

8. In an indicating assembly of a weighing scale, in combination, an indicia bearing member, a frame supporting said member, a housing covering said member, an indicia viewing assembly, a second frame that supports the viewing assembly and that is movably mounted on the first frame, said viewing assembly being movable by movement of the second frame between a viewing position and a non-viewing position, locking means for holding the second frame with the viewing assembly in viewing position, and decorative caps on the housing for concealing the locking means.

9. In a structure of the class described, in combination, an indicia bearing member, a frame supporting said member, a housing covering said member, an indicia viewing assembly, a second frame that supports the viewing assembly, said second frame comprising a pair of legs slidably mounted on said first frame whereby the second frame may be moved from a retracted to an extended position, and a light source mounted on the second frame in a position that is exposed when the frame is in extended position.

LAWRENCE S. WILLIAMS.

REFERENCES CITED

The following references are of record in the file of this patent:

UNITED STATES PATENTS

| Number | Name | Date |
|---|---|---|
| 1,804,464 | Fuller | May 12, 1931 |
| 2,071,676 | Williams | Feb. 23, 1937 |
| 2,172,802 | Marshall et al. | Sept. 12, 1939 |
| 2,366,947 | Williams | Jan. 9, 1945 |